United States Patent
Osha

(12)
(10) Patent No.: US 6,249,060 B1
(45) Date of Patent: Jun. 19, 2001

(54) MULTIPLEXED CABLING SYSTEM FOR A VEHICLE

(76) Inventor: Jonathan P. Osha, 1011 Pinewood Dr., Seabrook, TX (US) 77586

( * ) Notice: Subject to any disclaimer, the term of this patent is extended or adjusted under 35 U.S.C. 154(b) by 0 days.

(21) Appl. No.: 09/335,650

(22) Filed: Jun. 18, 1999

(51) Int. Cl.[7] .................................................. B60L 1/00
(52) U.S. Cl. ................................. 307/10.1; 307/9.1
(58) Field of Search ................................. 307/9.1, 10.1; 340/459, 825.16; 370/438; 455/517

(56) References Cited

U.S. PATENT DOCUMENTS

| | | | |
|---|---|---|---|
| 3,651,454 | * | 3/1972 | Venema et al. ................. 340/52 F |
| 5,313,460 | * | 5/1994 | Schmid ............................ 370/85.1 |
| 5,448,759 | * | 9/1995 | Krebs et al. ..................... 455/54.1 |
| 5,450,403 | * | 9/1995 | Ichii et al. ...................... 370/85.1 |
| 5,508,689 | * | 4/1996 | Rado et al. ................... 340/825.06 |

* cited by examiner

*Primary Examiner*—Josie Ballato
*Assistant Examiner*—Sharon Polk
(74) *Attorney, Agent, or Firm*—Rosenthal & Osha, L.L.P.

(57) ABSTRACT

A multiplexed system for a vehicle is disclosed for control of electrically operated components. The system includes an integrated power and communications bus for sending power and commands to vehicle components, multiplexing hardware to send multiple commands along two or more buses, control processor circuitry to control the process, wire harness with interface connections for electrically operated components, and selectable communication bandwidths for component to bandwidth matching.

27 Claims, 7 Drawing Sheets

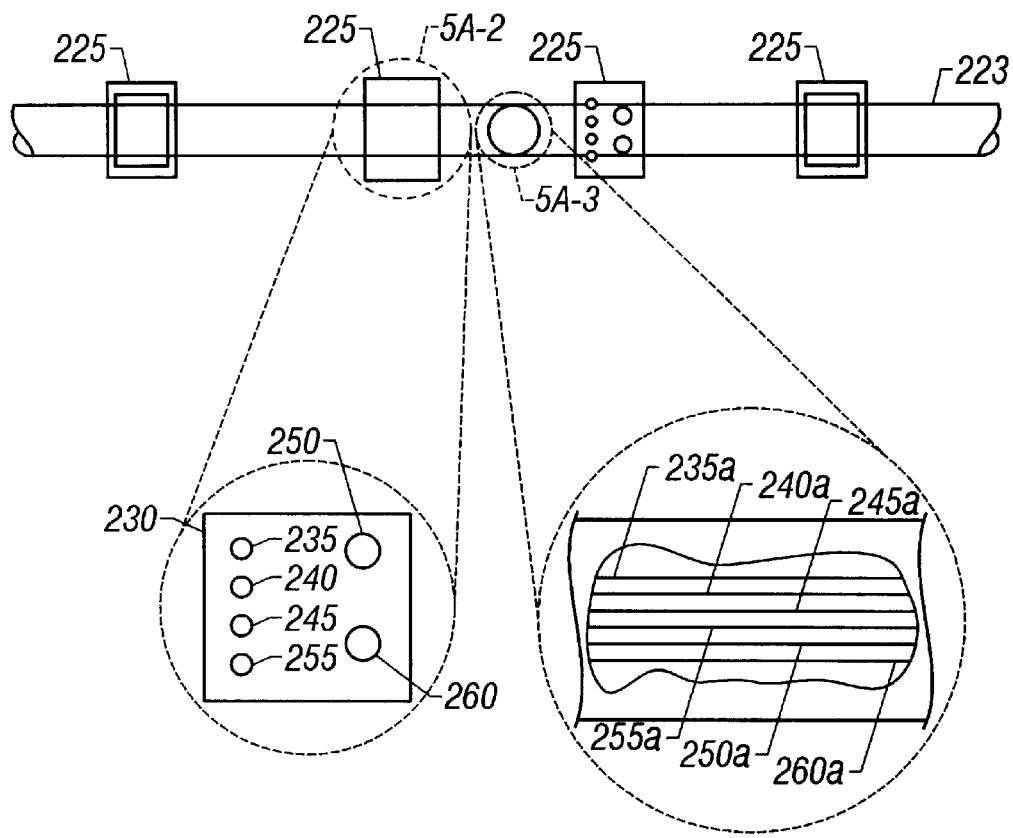
FIG. 5A
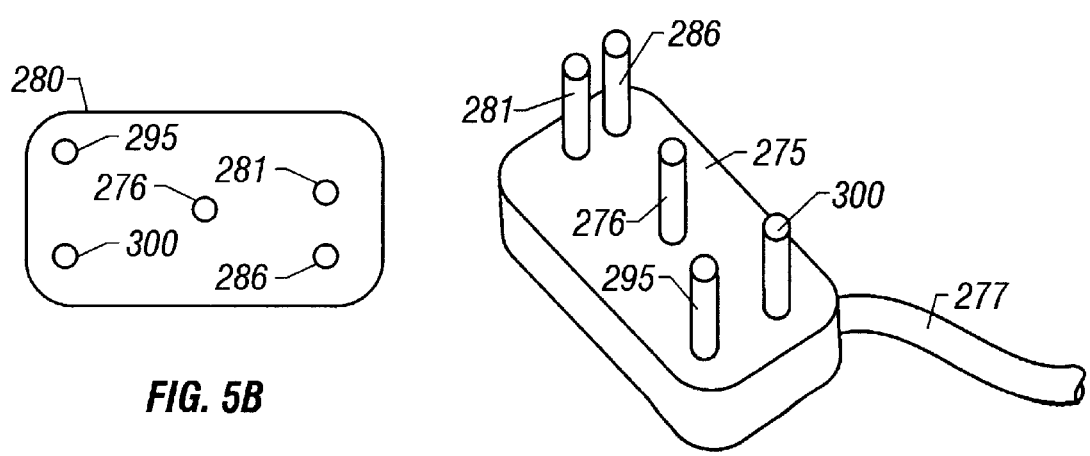
FIG. 5B
FIG. 5C

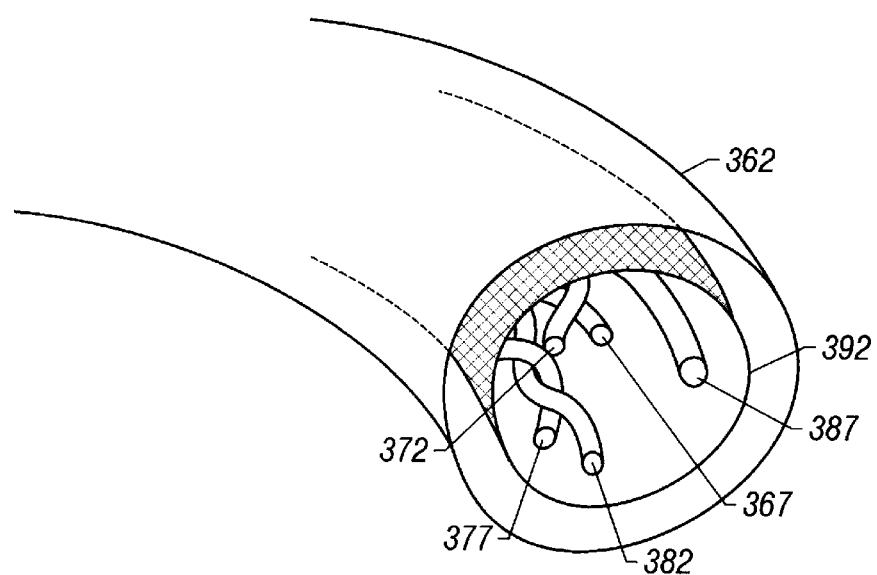
FIG. 5G
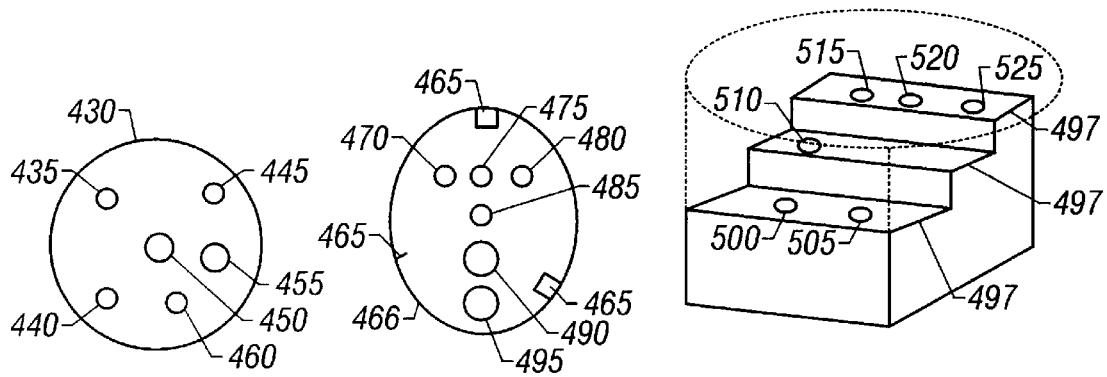
FIG. 6A  FIG. 6B  FIG. 6C

MULTIPLEXED CABLING SYSTEM FOR A VEHICLE

FIELD OF INVENTION

The invention relates to digital multiplexed communications. More particularly, the invention relates to motor vehicle control via multiplexed communications.

BACKGROUND OF THE INVENTION

Motor vehicle electronics have changed drastically in the last thirty years. Prior to the early 1980s, computer electronics had not matured sufficiently to allow incorporation into vehicles. Electrically operated components were attached to the main electrical system via wire harnesses strung throughout the vehicle.

A typical late model vehicle 10, illustrated in FIG. 1a, has an electrical system 12, including wire harnesses 14 connecting, e.g., a battery 15, starter 16, lights 18, and console 20. Shown in diagram form in FIG. 1b, the electrical system 12 includes starter 16, an alternator 30 and battery 15 supplying power to the vehicle. The power is usually controlled through manual dashboard or door mounted switches and relays 34, with peak power transient protection managed through a fuse box 36. When a manual switch or relay 34 completes a circuit, the power flows to the associated motors 38, electronics 40, lights 18, or heaters 44.

Electronic technology has advanced to the point that most automobiles implement advanced electronics technology to control everything from ignition systems to antilock braking systems. As more electrical components are added to a vehicle, more wires must be added to the wire harnesses, increasing their thickness. Thicker wire harnesses lead to several design issues, most notably difficulty in installing wire harnesses throughout the vehicle. For example, there is a practical limit to how many wires can be strung through vehicle door canals before the vehicle door's operation is affected. Including individual wires for window controls, locks, outside mirror controls and other switches and lights can make proper opening and closing of the doors difficult. The future sees even more electronics being added to vehicles.

To resolve this problem, manufacturers have begun to use multiplexing communications technology. With multiplexing technology, numerous electronic modules are linked by a single signal wire in a bus typically also containing a power supply bus wire. Far fewer wires are required than those found in the conventional arrangement discussed above.

A typical multiplexed circuit 50, illustrated in FIG. 2a, includes a control processor 52 and a multiplexing unit 54. A wire harness 56 contains a communication bus also known as a control bus, a power supply bus, and a ground bus 58 which connect vehicle components 64 and 68 via cables 60 and connectors 61. The vehicle components 64 communicate digitally with the control processor 52 via multiplexing units 62 and 66. The multiplexers 54, 62, 66 send and receive digital signals consisting of commands and status data. A command is a signal that actuates a component, and status data is a signal that indicates the component's state or condition. In the typical system, digital commands are broadcast to all components over the bus wire 58. Each command has one or more addresses appended to it, so the components can tell which to ignore and which to read. Depending on a component's complexity, component status data is broadcast to the control processor 52 so real or near real-time operations, and fault detection and recovery can be performed. Any power the vehicle components need is drawn from the power bus.

The likely applications for multiplexed buses in vehicles span everything from one-shot tasks (actuating a door lock) to intricate activities (engine control). To cope with this broad range, the Society of Automotive Engineers (SAE) has defined; in specification J2057, available from the SAE, in Warrendale, Pa.; three vehicle network categories called Class A, Class B, and Class C. The system described in this specification is one example of how multiplexing may be used to simplify and improve control of electrical systems in a vehicle.

An example of a vehicle 70 employing a 3-bus control system is illustrated in FIG. 2b. The vehicle is provided with three control buses 72, 74, and 76 distributed throughout the vehicle. Bus 72 is a Class A bus, bus 74 is a Class B bus, and bus 76 is a Class C bus. The Class A bus 72 is connected to vehicle components via interfaces 78. The Class A bus operates fundamentally as described with reference to circuit 50 above. The hardware components necessary to interface with the Class A bus are the least expensive as compared to the hardware required to interface with Class B and Class C buses. The vehicle control processors need send only simple commands and receive simple telemetry from electrical components actuated using the Class A bus.

The Class B bus 74 is connected to vehicle components via interfaces 80. The Class B bus also operates fundamentally as described with reference to circuit 50 above. The Class B bus has a "mid-range" bandwidth that is wider than the Class A bus but not as wide as a Class C bus. The Class B bus meets all the Class A bus requirements and can therefore interface with simple components as well as more complex components such as alternators and electronic ignitions. The hardware required to interface with the Class B bus is more expensive than that required for the Class A bus but not as expensive as the Class C interface hardware.

The Class C bus 74 is connected to vehicle components via interfaces 82. The Class C bus also operates fundamentally as described with reference to circuit 50 above. The class C bus has a "wide" bandwidth that is wider than both Class A and B. The class C bus meets all the Class A and B bus requirements and can therefore interface with less demanding components as well as components requiring real-time control such as antilock braking systems and active suspensions. This allows a vehicle's control processor to coordinate components to improve efficiency as well as safety. Motorola Corporation offers multiplexers specifically designed to meet the Class A, B and C, SAE J2057 standard. Control processors are standard in the industry and are familiar to those skilled in the art.

Manufacturers such as Daimler-Chrysler have implemented simple multiplexed control systems in automobiles. Using a single bandwidth bus, such as the Class B or Class C bus, electrically controlled components are operated. A typical vehicle 90, illustrated in FIG. 2c, shows a single class bus 92 installed throughout the vehicle 90. The bus 92 is connected to vehicle components via interfaces 94.

This implementation necessarily requires the manufacturer to use the same interface hardware for all electrically controlled components within a vehicle. In ultra-luxury vehicles such as Mercedes-Benz, the manufacturer may use fiber optic cabling with a Class C type bus to distribute information to and from control processors allowing vehicle component control. This necessarily increases the overall vehicle cost because the interface hardware costs increase as the bus bandwidth increases. In the single bus implementation, the most expensive hardware must be used even for the components that otherwise could be controlled using a narrower bandwidth bus. Clearly, if vehicle components can be matched with bus bandwidths appropriate for their needs, fewer high cost interface multiplexers would be required, lowering the overall vehicle cost. However, as shown in FIG. 2b, this requires distributing three separated harnesses throughout the vehicle.

Another emerging issue with vehicle design is multi-voltage systems. Novel electrical equipment, like electro-mechanical valve actuators and active suspensions may eventually triple the aggregate electrical power demand in some cars from 800 W today to an average of 2500 W and a peak value above 12 kW. That power can be more effectively distributed and utilized at voltages much higher than the 12 V dc currently used. Therefore, a system that can control and monitor vehicle components, using an integrated bus with selectable bus bandwidths and identical interfaces is desirable. Additional capabilities such as component bus bandwidth matching and voltage conversion units to accommodate multi-voltage systems adds to the system desirability.

SUMMARY OF THE INVENTION

In one aspect, the invention relates to an electrical system for a vehicle having a power supply and a plurality of electrically operated components, comprising a control processor arranged to control operation of the plurality of electrically operated components; and an integrated bus interconnecting the power supply, the control processor, and the plurality of electrically operated components, said integrated bus comprising a power supply bus, a ground bus, a first communication bus of a first bandwidth and a second communication bus of a second bandwidth.

A first one of said electrically operated components utilizes the first communication bandwidth and a second one of said electrically operated components utilizes the second communication bandwidth; and wherein the control processor communicates with the first electronically operated component via the first communication bus and communicates with the second electrically operated component via the second communication bus.

In another aspect, the invention relates to an integrated bus for a vehicle having a power supply, a plurality of electrically operated components, and a control processor arranged to control operation of the plurality of electrically operated components, the integrated bus comprising a power supply line; a ground line; a first communication bus operating at a first bandwidth and a second communication bus operating at a second bandwidth; and a plurality of interface connectors distributed along the integrated bus.

A first one of said electrically operated components utilizes the first communication bandwidth and a second one of said electrically operated components utilizes the second communication bandwidth; the control processor communicates with the first electronically operated component via the first communication bus and communicates with the second electrically operated component via the second communication bus; and the power supply line, ground line, and communication busses are configured in a single wire harness.

In another aspect, the invention relates to a system for distributing commands and power within a vehicle, comprising an integrated bus distributed within the vehicle and comprising power distribution means for supplying vehicle components with power; communication means for communicating between the vehicle components and a control processor, the communication means having a communication path of a first bandwidth and a communication path of a second bandwidth; ground connection means for connecting vehicle components to vehicle ground; a plurality of interface connectors distributed at locations along the integrated bus; a plurality of cooperative component connectors each connected to a vehicle component; and selection means for selecting an appropriate one of the first and second communication paths based upon a type of vehicle component to which a component connector is attached.

In another aspect, the invention relates to a method of controlling electrically operated components in a vehicle having a power source, comprising applying control signals to a first electrically operated component via a first communication bus; and applying control signals to a second electrically operated component via a second communication bus, the first and second communication buses forming part of an integrated bus.

In another aspect, the invention relates to a method of installing a command and power distribution system within a vehicle, comprising installing an integrated bus throughout the vehicle such that interface connectors are available to electrically operated components, the integrated bus having a communication path of a first bandwidth and a communication path of a second bandwidth; connecting the electrically operated components to the interface connectors; and selecting an appropriate one of the first and second communication paths for each electrically operated component.

In another aspect, the invention relates to an electrical system for a vehicle, comprising a power supply; a plurality of electrically operated components; a control processor arranged to control operation of the plurality of electrically operated components; an integrated bus interconnecting the power supply, the control processor, and the plurality of electrically operated components; and a plurality of integrated interface connectors distributed along the integrated bus, the plurality of integrated interface connectors being substantially identical.

A first one of said electrically operated components utilizes a first communication bandwidth and a second one of said electrically operated components utilizes a second communication bandwidth. The integrated bus comprises a power supply bus, a ground bus, a first communication bus of the first bandwidth and a second communication bus of the second bandwidth. The control processor communicates with the first electronically operated component via the first communication bus and communicates with the second electrically operated component via the second communication bus.

BRIEF DESCRIPTION OF THE DRAWINGS

FIG. 5a is a section view of a bus using identical mating interfaces along a multiplexed, multi-class bus with selectable junctions in accordance with an embodiment of the invention.

FIG. 5b is a top view of a bus connector configuration.

FIG. 5c is an orthogonal view of a component connector configuration.

FIG. 5g is a section view of a wire harness with twisted power and control bus lines, a ground line and a second ground line sheath.

FIG. 6a through FIG. 6c are section views of alternate control bus interface pin configurations.

DETAILED DESCRIPTION

Throughout the description and drawings items that are the same are designated with the same reference number. While reference is made herein to automotive electrical systems for purposes of illustration, it will be apparent that the method and apparatus of the invention are equally applicable to any type of vehicle, including without limitation an automobile, motorcycle, bus, truck, airplane, et cetera.

Figure 1A:
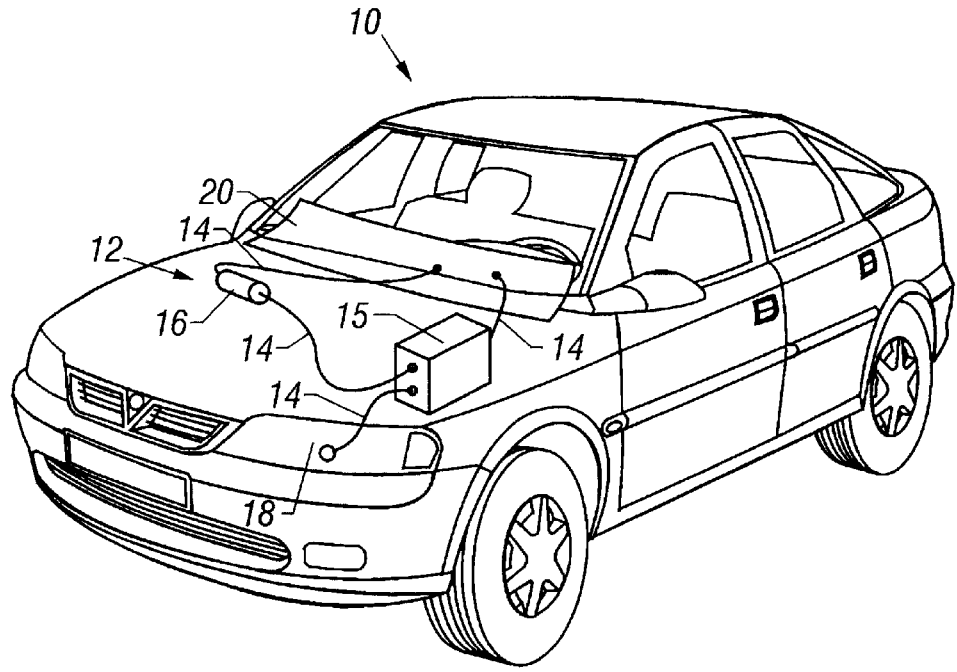
FIG. 1a is a perspective view of a typical vehicle's electrical system.
Figure 1B:
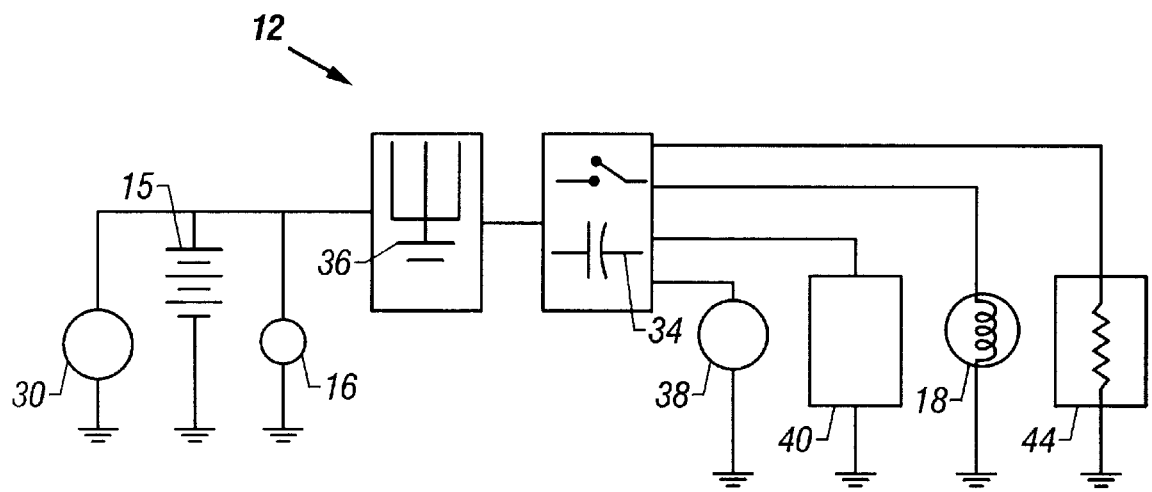
FIG. 1b is a schematic diagram of a typical vehicle's electrical system.
Figure 2A:
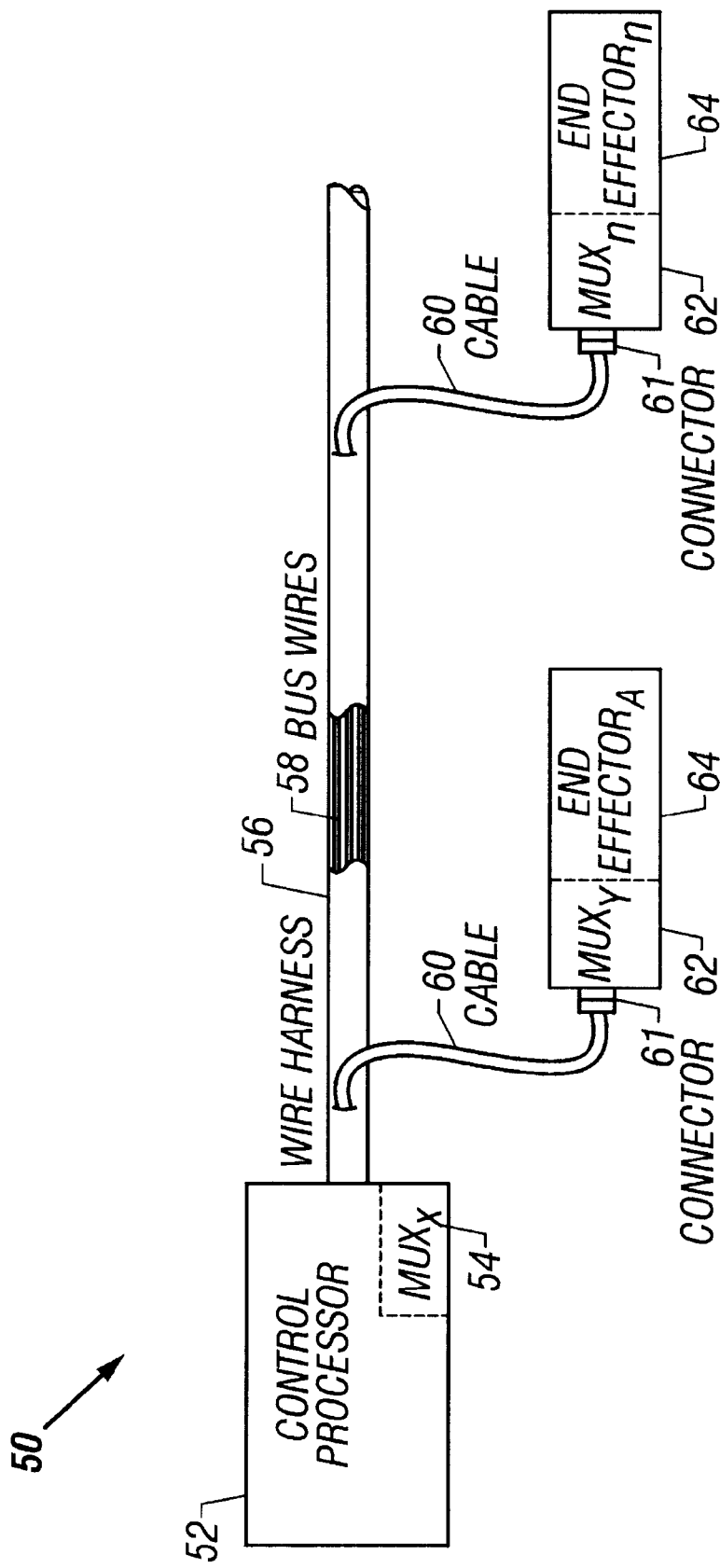
FIG. 2a is a representative implementation of a multiplexed control system.
Figure 2B:
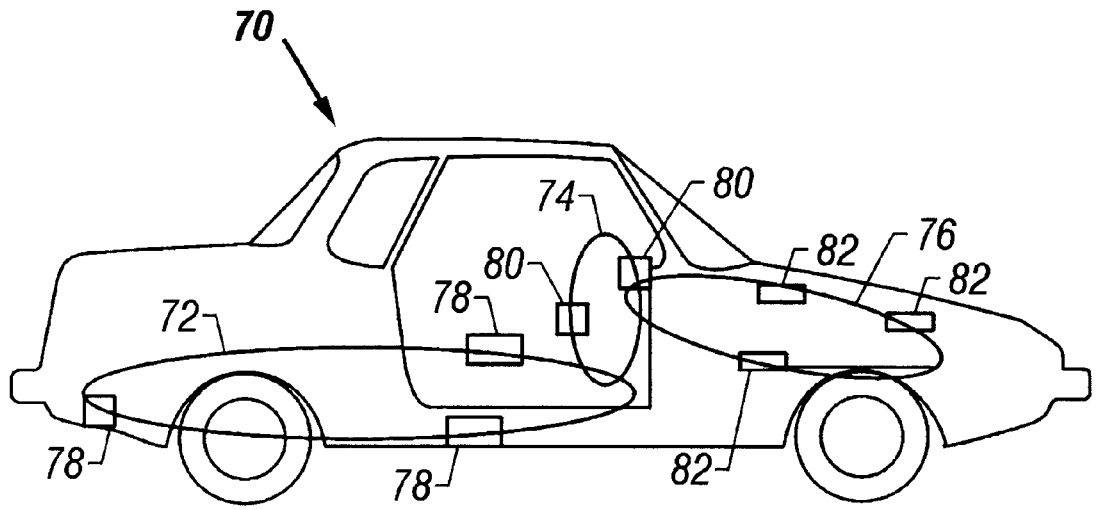
FIG. 2b is a sectional view of a vehicle employing three control bus classes for vehicle control.
Figure 2C:
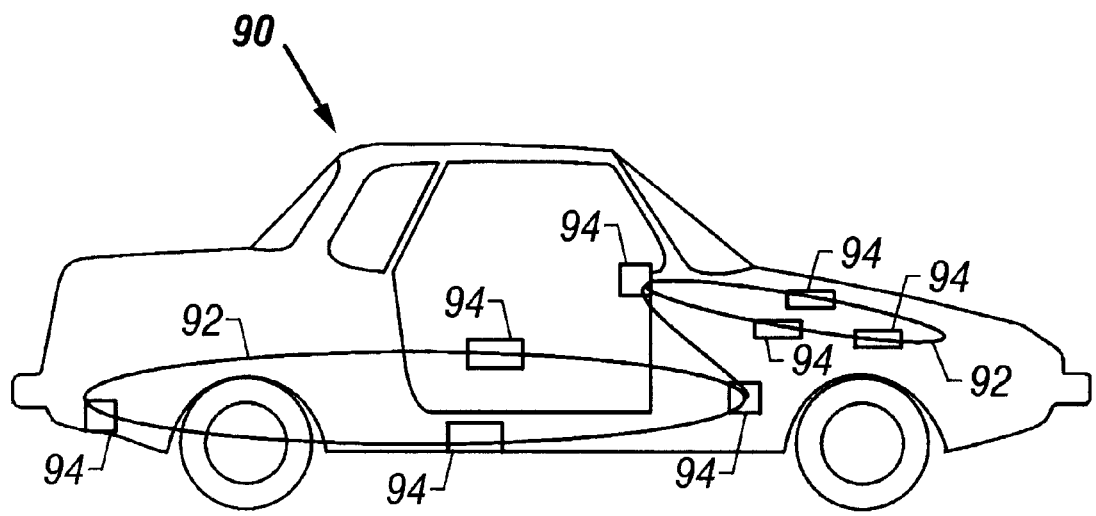
FIG. 2c is a sectional view of a current industry implementation for multiplexed control buses.
Figure 3:
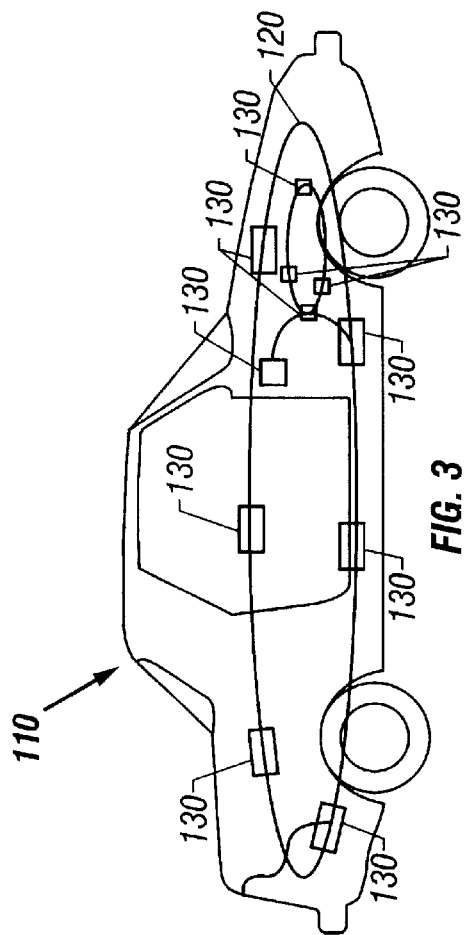
FIG. 3 is a section view of one embodiment of the invention.

An embodiment of the invention is shown in the cross-sectional view in FIG. 3, wherein a typical vehicle 110 has an integrated multiplexed control bus 120 distributed throughout its chassis. The integrated bus 120 is connected to vehicle components such as lights, braking systems, etc. via interfaces 130. For this embodiment, the interfaces 130 are identical. The integrated bus 120 operates fundamentally as described with reference to circuit 50, in FIG. 2a in the background section herein with the difference that instead of one control bus channel, this embodiment uses three control bus channels each having a different bandwidth integrated within the same wire harness. By combining three control buses into one wire harness and using identical interfaces, a manufacturer can match the appropriate multiplexer hardware and interface connections with a particular component's power and communications needs. Additionally, using identical interfaces connections allows parts inventory reduction and improved quality through reduction in complexity of manufacturing and repair.

Figure 4:
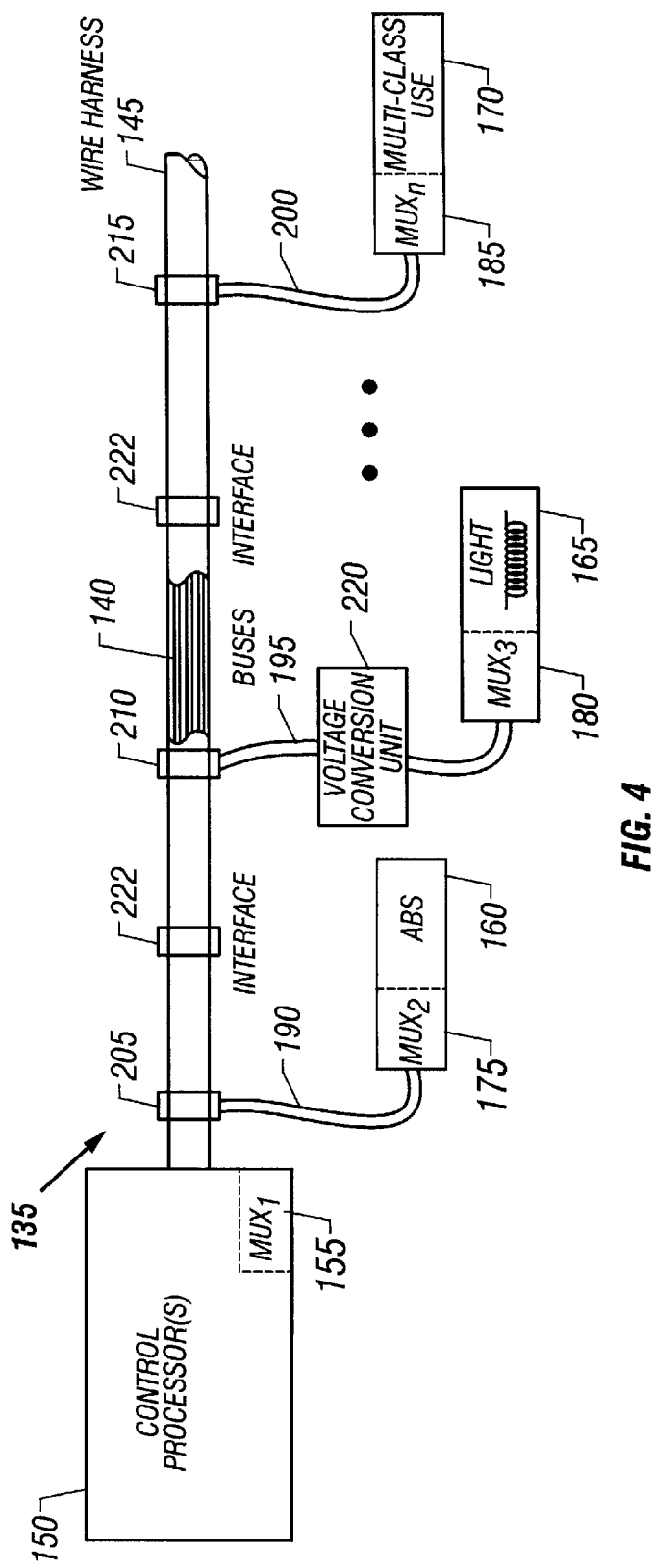
FIG. 4 is a representative implementation of a multi-class bus with selectable junctions, in accordance with an embodiment of the invention.

FIG. 4 shows a representative bus implementation 135 depicting a multi-class bus with selectable junctions. Three multiplexed control buses 140 are combined into one wire harness 145 and are controlled by a single or multiple control processors 150 which include the appropriate multiplexer circuitry 155 to operate the three buses simultaneously. Communications between the control processor 150 and vehicle components 160, 165 and 170 are handled through multiplexers 155, 175, 180 and 185 respectively. Each component 160, 165, and 170 interfaces with the wire harness via cables 190, 195, and 200 having identical connectors 205, 210, and 215 respectively. A voltage conversion unit 220 may be incorporated into the component, cable, and connector configuration to accommodate multi-voltage systems. Unused connector interfaces 222 are also shown and are available for additional component connections as described above.

FIG. 5a shows a typical wire harness section 223 and an interface connector configuration 225 in accordance with an embodiment of the invention. In this embodiment, interface connector 230 is provided with interface connector junctions, which in this embodiment are sockets 235, 240, and 245, connected to low-rate bus 235a, medium-rate bus 240a, and high-rate bus 245a, respectively. Sockets 250, 255 and 260 may also be provided for a voltage supply bus 250a and two ground lines 255a and 260a, respectively. Either ground line 255 or 260 could be used as a Gaussian shield, i.e., may be wrapped around the other lines or may be formed as a conductive sheath. FIG. 5b depicts a typical component connector 280, which in this embodiment is a female connector and FIG. 5c depicts its matching male connector 275. In accordance with an embodiment of the invention, the connectors can be secured or coupled in any mutually matable fashion. In this embodiment, both connectors 280 and 275 have interface connector junction and component connector junction locations, also known as pin and socket locations, having a power supply bus 276, a ground 281, and three multiplex bus connections 286, 295, and 300.

The interface connectors 230 in FIG. 5a which are distributed along the integrated multiplexed harness 223 are preferably identical. Each of the sockets on the connector 230, which in this embodiment is the female half of the connector, are hardwired to the respective buses within the harness 223. During manufacture of the vehicle, the harness 223 is first distributed about the vehicle such that connectors 225 are accessible for connection to electrically operated components. As described in more detail below, each connector preferably is initially fitted with a protective cover to prevent contamination by moisture and dirt in the event it is not used.

In another embodiment of this invention, connector 280, in FIG. 5b, which represents another version of the identical connectors 225 in FIG. 5a, replaces connector 230 along the same wire harness 223 in FIG. 5a. Each component to be used on the vehicle in this embodiment is then fitted with the male half 275 shown in FIG. 5c, of the connector 280 via a pigtail 277 and an appropriate multiplexer or other circuitry (see FIG. 4). Depending upon the operational needs of the particular component, electrical connection is made only to the necessary pins on the connector half 275. Thus, for example, if the component is a tail light requiring only the lowest bandwidth control bus, electrical connection is made only to the pin connecting to the lowest bandwidth (pin 286 in FIG. 5c), the power supply bus, and the ground bus 276, 300. If, on the other hand, the component is for example an engine control component requiring a high bandwidth, connection will be made to the pin corresponding to the highest bandwidth bus (pin 295 in FIG. 5c) as well as the power supply and ground bus 276, 300. A component requiring medium bandwidth communication could be wired to the pin corresponding to the medium bandwidth bus (pin 281 in FIG. 5c) as well as the power supply and ground bus 276, 300. This process of selecting the appropriate bus for a given component will be referred to herein as "pin selection." In each of these three instances, the pins that are not used will have no electrical connection through the pigtail 277. In one embodiment, these unused pins can be replaced with plastic or rubber pins or other suitable elements to prevent moisture or dirt from entering the unused sockets on the female half of the connector, for example 286 and 295 in FIG. 5c when the medium bandwidth bus is in use.

In accordance with the above, it is apparent that the invention provides an integrated multiplexed bus with a plurality of identical connections that are made available throughout the vehicle. By selectively wiring the male half of the connector as is appropriate to the particular functionality of the component to which it is attached, selection of the appropriate bandwidth bus is made simply by plugging the male half of the connector into any available female connector. Accordingly, the appropriate bus is matched with the appropriate vehicle component without necessitating any wiring or additional labor during manufacture of the vehicle. Moreover, because identical connector halves are employed, manufacturing costs and complexity are greatly reduced. Once the components are installed, the vehicle control processor 150, such as that shown in FIG. 4 and discussed above, is able to poll each bus and determine which components are using each bus and what services must be provided to each bus.

It will be understood that the preceding embodiment employing sockets and pins is but one example of how "pin selection" may be achieved. The term "pin selection" is hereby defined to be generic to any type of interconnection wherein bus selection is made by connecting to less than all of the junctions available on the component side of the connections. Thus, the junctions may be other types of electrical connections, e.g., slots, grooves, runs, etc., or may be optical, radio frequency, infra-red, or any other suitable means for transferring information through the junctions.

An alternative to pin selection is self-configuring bus electronics. In this embodiment, connection would be made to all the junctions (in this embodiment, pins) on connector half 275. The self-configuring system will poll all available buses, determine the component types installed throughout the system, determine the required services that must be provided to each, and broadcast multiplexed commands to components using only the appropriate bus. For example, if after polling the system, the control processor (150 in FIG. 4) finds a component that requires medium-rate bus communications, the processor thereafter sends commands to that component only over the medium-rate bus. This reduces the chances that commands will go to the wrong component.

Figure 5D:
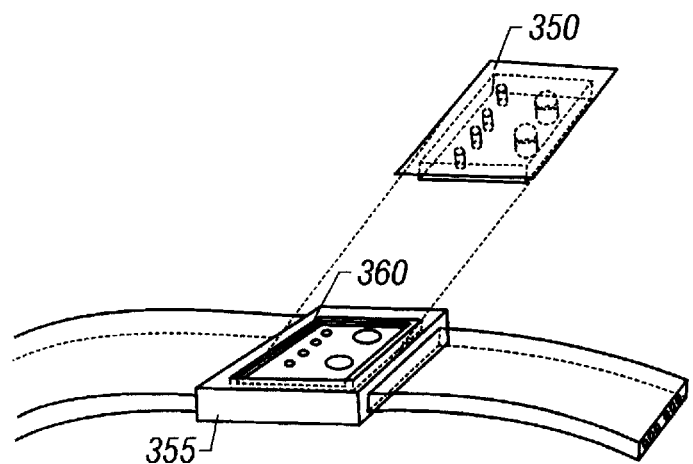
FIG. 5d is a section view of a protective covering configuration for protecting unused control bus interfaces in accordance with an embodiment of the invention.

FIG. 5d shows an optional protective cover 350 that may be installed to protect an unused interface connector 355 in accordance with an embodiment of the invention. A shelf 360 is integrated into the connector opening to accommodate protective cover 350 and to facilitate a positive protective cover 350 seal. Protective cover 350 and connector 355 can be either male or female as appropriate. Prior to connection of a vehicle component, the connection 355 nearest to the component's location can be readied by removing the cover 350 and connecting the vehicle component to the connector 355.

Figure 5E:
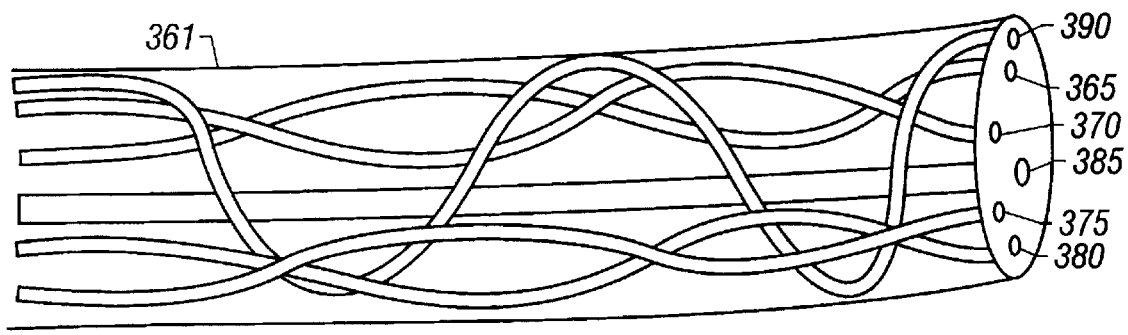
FIG. 5e is a section view of a wire harness with twisted ground, power, and control bus lines.

FIG. 5e shows one embodiment of a wire harness 361 having low-rate 365, medium-rate 370, and high-rate 375 buses with power 380 and grounds 385, 390 configured in a twisted, circular fashion. The wires 365, 370; 375, 380; and 390, 385 are twisted to protect the multiplexed communication and power lines from electrical interference.

Figure 5F:
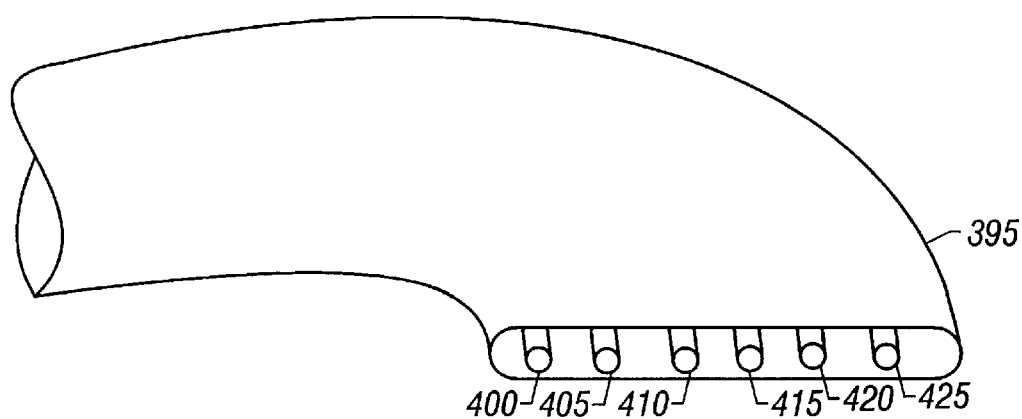
FIG. 5f is a section view of a wire harness with substantially planar ground, power, and control bus lines.

FIG. 5f shows another embodiment of a wire harness 395 having low-rate 400, medium-rate 405, and high-rate 410 buses with power 415 and grounds 420, 425 configured in a substantially parallel and substantially planar fashion.

FIG. 5g shows yet another embodiment of a wire harness 362 having low-rate 367, medium-rate 372, and high-rate 377 buses with power 382 and ground 387 configured in a twisted, circular fashion. Wire sheath 392 acts as a ground and shield protecting the multiplexed communication and power lines from electrical interference.

FIG. 6a through FIG. 6c show embodiments of connector pin layouts in accordance with the invention. The layout in FIG. 6a shows connector 430 configured with low-rate 435, medium-rate 440, and high-rate 445 buses in a circular configuration with power 450 and grounds 455, 460. FIG. 6b incorporates keying, clocking, and non-uniform connector shape features 465 into the connector 466 along with a differing pin layout to achieve connections that preclude improper installation. Connector 466 can be configured with low-rate 470, medium-rate 475 and high-rate 480 buses in a non-circular configuration with power 490 and grounds 485, 495. The connector shown in FIG. 6c further incorporates a varied depth connector layout 497 for greater protection from improper connector installation. Connector 497 is configured with low-rate 500, medium-rate 505 and high-rate 510 buses in a non-circular configuration with power 515 and grounds 520, 525.

Vehicle design and manufacturing is a complex process that requires many disciplines to coordinate their efforts to produce a product that is marketable within a highly competitive environment. Improvements in manufacturability, quality, maintainability, or similar vehicle attributes can reap great benefits for the industry. This invention encompasses improvements that both meet today's needs and prepare vehicle manufacturers for future increases in vehicle electrical system complexity. A vehicle implementing an embodiment of this invention can control currently available vehicle systems, is expandable to handle future vehicle system needs, has greater quality, reduced costs from parts inventory reduction, and can have fewer manufacturing errors due to improper component installation.

The preceding embodiments of the invention have been described for purposes of illustration and understanding only. Those skilled in the art will appreciate that other embodiments and variations of this invention exist, and that such embodiments and variations do not depart from the spirit of the invention as disclosed herein. Accordingly, the invention shall be limited in scope only by the attached claims.

What is claimed is:

1. An electrical system for a vehicle having a power supply and a plurality of electrically operated components, comprising:

a control processor arranged to control operation of the plurality of electrically operated components; and an integrated bus interconnecting the power supply, the control processor, and the plurality of electrically operated components, said integrated bus comprising a power supply line, a ground line, a first communication bus of a first bandwidth, a second communication bus of a second bandwidth, and a third communication bus of a third bandwidth;

wherein a first one of said electrically operated components utilizes the first communication bandwidth, a second one of said electrically operated components utilizes the second communication bandwidth, and a third one of said electrically operated components utilizes the third communication bandwidth; and wherein the control processor communicates with the first electronically operated component via the first communication bus, communicates with the second electrically operated component via the second communication bus, and communicates with the third electrically operated component via the third communication bus.

2. The electrical system of claim 1, wherein communication bus selection is performed by self-configuring bus electronics.

3. The electrical system of claim 1, further comprising a plurality of integrated interface connectors distributed along the integrated bus.

4. The electrical system of claim 3, wherein the plurality of integrated interface connectors are identical.

5. The electrical system of claim 3, wherein the plurality of integrated interface connectors are sealed when not in use.

6. The electrical system of claim 1, wherein communication bus selection is performed by pin selection.

7. The electrical system of claim 6, further comprising:
   a plurality of integrated interface connectors distributed along the integrated bus, each said interface connector having integrated connector junctions connected to each of the integrated buses; and
   a plurality of component connectors removably engaged with the interface connectors and having component connector junctions corresponding to the integrated connector junctions,
   wherein one of the component connectors is connected to a vehicle electrical component requiring communications at the first bandwidth, wherein electrical communication between the first communication bus and the electrical component is achieved via the integrated connector junction and the component connector junction corresponding to the first communication bus, and wherein the component connector junction and the integrated connector junction corresponding to the second bandwidth are unused.

8. The electrical system of claim 7, wherein another one of the component connectors is connected to an electrical component operating at a second bandwidth; and
   wherein the component connector junction and interface connector junction corresponding to the first bandwidth is unused.

9. An integrated bus for a vehicle having a power supply, a plurality of electrically operated components, and a control processor arranged to control operation of the plurality of electrically operated components, the integrated bus comprising:
   a power supply line;
   a ground line;
   a first communication bus operating at a first bandwidth, a second communication bus operating at a second bandwidth, and a third communication bus operating at a third bandwidth; and
   a plurality of interface connectors distributed along the integrated bus;
   wherein a first one of said electrically operated components utilizes the first communication bandwidth, a second one of said electrically operated components utilizes the second communication bandwidth, and a third one of said electrically operated components utilizes the third communication bandwidth;
   wherein the control processor communicates with the first electronically operated component via the first communication bus, communicates with the second electrically operated component via the second communication bus, and communicates with the third electronically operated component via the third communication bus; and
   wherein the power supply line, ground line, and communication busses are configured in a single wire harness.

10. The integrated bus of claim 9, wherein the plurality of integrated interface connectors are identical.

11. The integrated bus of claim 9, wherein the plurality of integrated interface connectors are sealed when not in use.

12. The integrated bus of claim 9, wherein the communication busses are substantially parallel and coplanar within the wire harness.

13. The integrated bus of claim 9, wherein the communication busses are twisted together within the wire harness.

14. The integrated bus of claim 9, wherein communication bus selection is performed by self-configuring bus electronics.

15. The integrated bus of claim 9, wherein communication bus selection is performed by pin selection.

16. An integrated bus for a vehicle having a power supply, a plurality of electrically operated components, and a control processor arranged to control operation of the plurality of electrically operated components, the integrated bus comprising:
   a power supply line;
   a ground line;
   a first communication bus operating at a first bandwidth and a second communication bus operating at a second bandwidth; and
   a plurality of interface connectors distributed alone the integrated bus;
   wherein a first one of said electrically operated components utilizes the first communication bandwidth and a second one of said electrically operated components utilizes the second communication bandwidth;
   wherein the control processor communicates with the first electronically operated component via the first communication bus and communicates with the second electrically operated component via the second communication bus; and
   wherein the power supply line, ground line, and communication busses are configured in a single wire harness;
   wherein the ground line forms a sheath wrapped around the power supply line and the communication busses.

17. An integrated bus for a vehicle having a power supply, a plurality of electrically operated components, and a control processor arranged to control operation of the plurality of electrically operated components, the integrated bus comprising:
   a power supply line;
   a ground line;
   a first communication bus operating at a first bandwidth and a second communication bus operating at a second bandwidth; and
   a plurality of interface connectors distributed along the integrated bus;
   wherein a first one of said electrically operated components utilizes the first communication bandwidth and a second one of said electrically operated components utilizes the second communication bandwidth;
   wherein the control processor communicates with the first electronically operated component via the first communication bus and communicates with the second electrically operated component via the second communication bus; and
   wherein the power supply line, ground line, and communication busses are configured in a single wire harness:
   further comprising a second ground line.

18. A system for distributing commands and power within a vehicle, comprising:

an integrated bus distributed within the vehicle and comprising:
  power distribution means for supplying vehicle components with power;
  communication means for communicating between the vehicle components and a control processor, the communication means having a first communication path of a first bandwidth, a second communication path of a second bandwidth and a third communication path of a third communication bandwidth;
  ground connection means for connecting vehicle components to vehicle ground;
  a plurality of interface connectors distributed at locations along the integrated bus;
  a plurality of cooperative component connectors each connected to a vehicle component; and
  selection means for selecting an appropriate one of the first, second, and third communication paths based upon a type of vehicle component to which a component connector is attached.

19. The system of claim 18, wherein the selection means comprises self-configuring electronics.

20. The system of claim 18, wherein the selection means comprises pin selection.

21. A method of controlling electrically operated components in a vehicle having a power source, comprising:
  applying control signals to a first electrically operated component via a first communication bus;
  applying control signals to a second electrically operated component via a second communication bus;
  applying control signals to a third electrically operated component via a third communication bus, wherein the first, second and third communication buses form part of an integrated bus.

22. The method of claim 21, further comprising selecting an appropriate one of the first, second and third communication buses for a particular electrically operated component using self-configuring electronics.

23. The method of claim 21, further comprising selecting an appropriate one of the first, second and third communication buses for a particular electrically operated component using pin selection.

24. The method of claim 21, further comprising addition of an electrically operated component by:
  removing a protective seal from an unused interface connector junction along the integrated bus;
  connecting the electrically operated component to the interface connector; and
  selecting an appropriate one of the first, second and third communication buses for communication with the electrically operated component.

25. A method of installing a command and power distribution system within a vehicle, comprising:
  installing an integrated bus throughout the vehicle such that interface connectors are available to electrically operated components, the integrated bus having a communication path of a first bandwidth, a communication path of a second bandwidth, and a communication path of a third bandwidth,
  connecting the electrically operated components to the interface connectors; and
  selecting an appropriate one of the first second, and third communication bandwidths for each electrically operated component.

26. The method of claim 25, further comprising removing a protective seal from an unused interface connector junction; and
  connecting an additional electrically operated component to the unused interface connector.

27. An electrical system for a vehicle, comprising:
  a power supply;
  a plurality of electrically operated components;
  a control processor arranged to control operation of the plurality of electrically operated components;
  an integrated bus interconnecting the power supply, the control processor, and the plurality of electrically operated components; and
  a plurality of integrated interface connectors distributed along the integrated bus, the plurality of integrated interface connectors being substantially identical;
  wherein a first one of said electrically operated components utilizes a first communication bandwidth, a second one of said electrically operated components utilizes a second communication bandwidth, and a third one of said electrically operated components utilizes a third communication bandwidth;
  wherein the integrated bus comprises a power supply bus, a ground bus, a first communication bus of the first bandwidth, a second communication bus of the second bandwidth, and a third communication bus of the third bandwidth; and
  wherein the control processor communicates with the first electronically operated component via the first communication bus, communicates with the second electrically operated component via the second communication bus, and communicates with the third electronically operated component with the third communication bus.

* * * * *